No. 782,956. PATENTED FEB. 21, 1905.
T. B. FERGUSON.
COFFEE POT.
APPLICATION FILED OCT. 20, 1904.
3 SHEETS—SHEET 1.
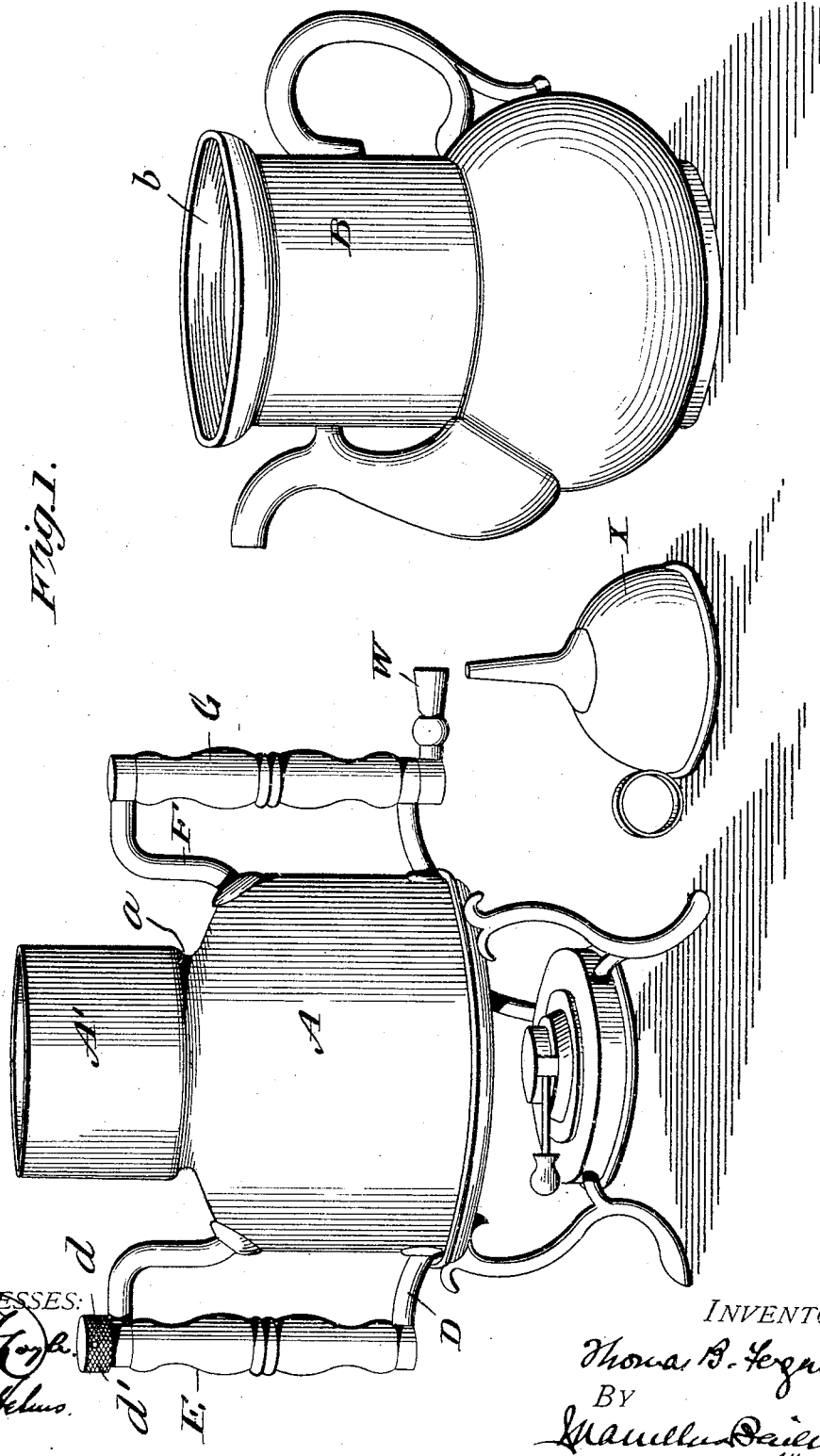

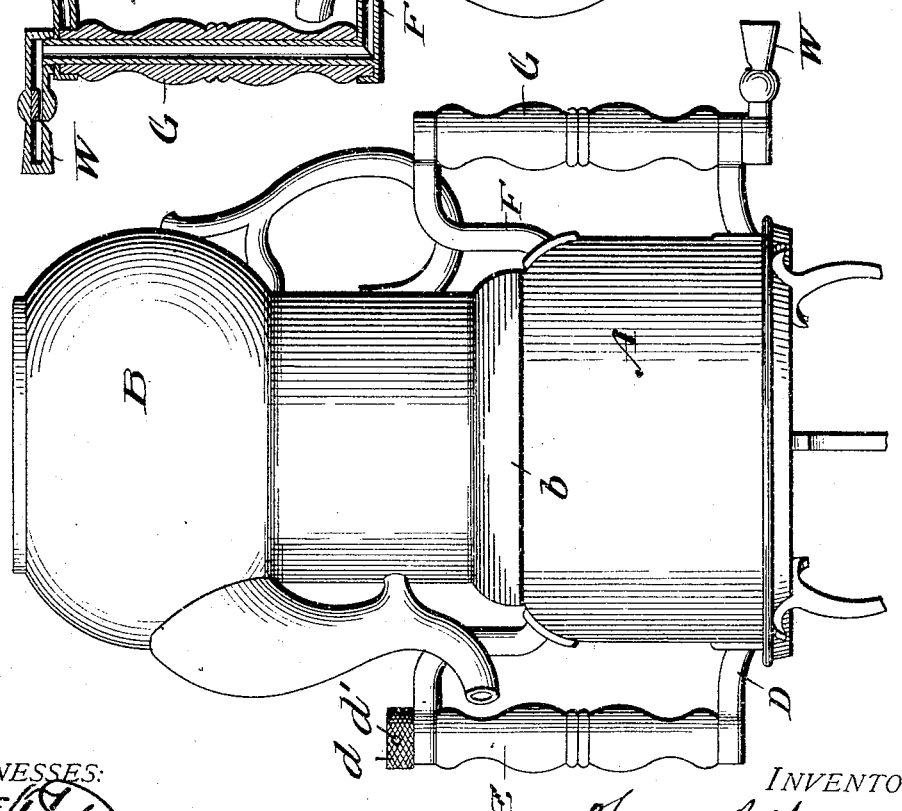

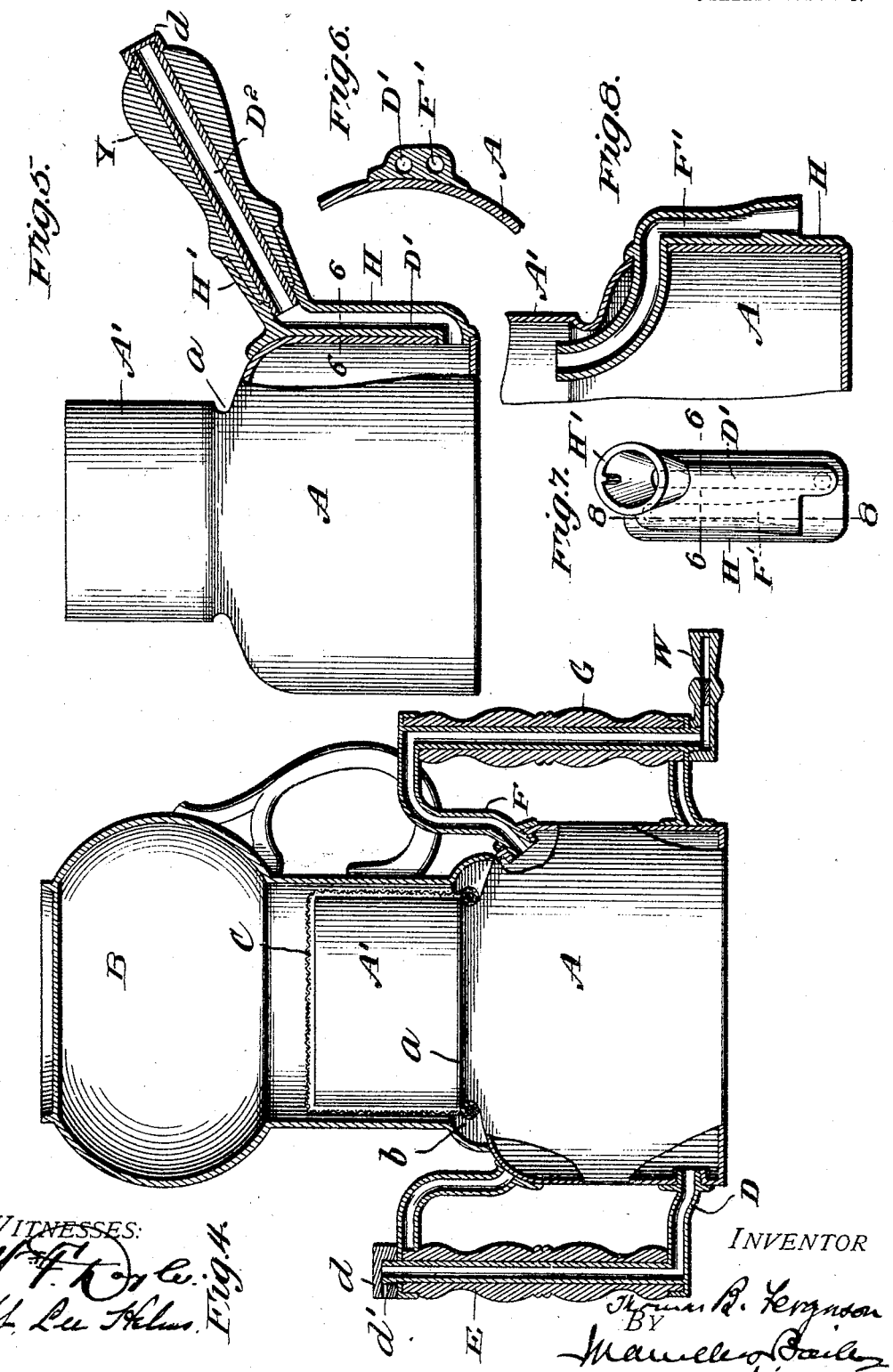

No. 782,956.

Patented February 21, 1905.

UNITED STATES PATENT OFFICE.

THOMAS B. FERGUSON, OF WASHINGTON, DISTRICT OF COLUMBIA.

COFFEE-POT.

SPECIFICATION forming part of Letters Patent No. 782,956, dated February 21, 1905.

Application filed October 20, 1904. Serial No. 229,259.

*To all whom it may concern:*

Be it known that I, THOMAS B. FERGUSON, of Washington city, in the District of Columbia, have invented certain new and useful Improvements in Coffee-Pots, of which the following is a specification.

My improvements are directed to that kind of a drip-coffee pot in which the pot proper is associated with a removable and reversible biggin in which the coffee is made and from which it is strained into the pot. The biggin has preferably a broad large bottom, which affords an extended heating-surface in the cooking, and a comparatively contracted neck to which the straining-cloth is applied, so formed as to fit quite loosely the top of the coffee-pot. The narrowing of the neck results in forming a chamber of small diameter as compared with the body of the biggin, but of considerable depth, in which when the biggin is reversed after the cooking operation the ground coffee will be assembled and concentrated as a filter-bed of considerable thickness through which the liquid must pass before it can reach the strainer. This is the preferred form of biggin; but other forms may be used, if desired. The strainer itself is a straining-cloth which covers the open mouth of the biggin and extends loosely down upon the exterior of the neck of the biggin, where it can be secured, as indicated in my Patent No. 748,491, of December 29, 1903, or in any other suitable way. The cloth which thus surrounds the exterior of the neck of the biggin serves as a straining-surface, just as does that portion of the cloth which extends over the mouth of the biggin, the fit between the pot and biggin being so loose that the portion of the straining-cloth which comes between them is under no material compression and the cloth itself making a loose fit around the neck. The straining-surface is thus very much increased, so that the liquid which passes slowly through the ground coffee will pass rapidly through the cloth into the pot below. By thus increasing the area of the straining-surface finer material or material of finer mesh can be used without diminishing the flow of filtered liquid and with better and more perfect filtration.

I provide, as in my prior patent hereinbefore referred to, an air-pipe entering the biggin at or near the end opposite to that end through which the liquid is strained or filtered. The pipe in my present construction extends toward the other end of the biggin to a height which will bring its open end (which opens to the external air) above the level of the liquid in the biggin when the latter is mouth uppermost and is preferably closed by a screw-cap which can be removed or moved more or less to admit air above the body of liquid in the reversed biggin when it is desired to let the liquid filter through the coffee. I also employ another air-pipe, which opens into the biggin at or near its neck or open end and extends thence to or nearly to the bottom of the biggin, where it opens into the external air. I remark that this pipe (marked F in the drawings hereinafter referred to) can be used to the exclusion of the other one first abovenamed, (marked D in the drawings.) It can be used when the biggin is inverted as a duct through which to add to the contents of the biggin, and the water thus added will, owing to the proximity of the inner end of the pipe to the neck of the biggin, be discharged as a stream upon the mass of coffee-grounds in the neck, thus preventing it from packing. At the same time it can be used to admit air to the interior of the reversed biggin above the liquid, inasmuch as the air, by reason of the superior external pressure, will be forced down through the pipe (if the latter be open at its outer end) into the liquid contents of the biggin, up through which it will pass. I can conveniently form one or both of these channels in the handle or handles with which the biggin may be provided.

In the accompanying drawings, to which I shall now refer for a better understanding of my invention, Figure 1 is a perspective view of the two parts of which my drip-coffee pot is composed, together with the funnel used for the purpose of adding to the contents of the biggin. Fig. 2 is a side elevation of the pot in the position it occupies when heat is applied to it. Fig. 3 is a like view of the same, partly in section, in the position it occupies when inverted. Fig. 4 is a vertical section diametrically through the pot with the parts in the position shown in Fig. 2. Fig. 5 is a side elevation, partly in section, of a modification in which the biggin is provided with one handle only. Fig. 6 is a section of the casting containing the two air pipes or channels on the line 6 6, Figs. 5 and 7. Fig. 7 is a front elevation of the casting in which the two air-channels are formed and to which the biggin-handle is secured. Fig. 8 is a section of the casting, together with a portion of the adjacent wall of the biggin, on line 8 8, Fig. 7.

A is the biggin, and B is the pot.

A' is the contracted neck of the biggin, which fits loosely into the mouth of the coffee-pot B, as seen more particularly in Fig. 4, there being an annular gutter $b$ around the top of the mouth of the pot to catch any leak or drip which might otherwise escape.

C is the straining-cloth. In the neck of the biggin is an annular external groove $a$, into which enters the cord or other fastener by which the straining-cloth is held in place over the mouth and around the sides of the neck of the biggin.

D is the air-pipe hereinbefore referred to, (conveniently formed in one of the biggin-handles, E, opening at its inner end into the biggin at or near its bottom, as shown clearly in Fig. 4, and extending thence upward until its outer end is above the normal level of the liquid in the biggin when the latter is in the position shown in Figs. 2 and 4. The outer end of the air-pipe D is closed by a screw-cap $d$, having a vent $d'$, which when the cap is partly unscrewed will be put in communication with the interior of the pipe, and thus allow air to enter it. When the biggin is in the position shown in Figs. 2 and 4, the pipe D can be used as a channel through which to add to the contents of the biggin; but it will be found quite as convenient to remove the coffee-pot and the strainer and to pour the liquid into the open mouth of the biggin. F is an air-pipe (conveniently formed in the other biggin-handle, G) opening at its inner end into the body of the biggin at a point adjacent to the junction of the body with the neck and thence extending outwardly toward the other end or bottom of the biggin, as seen in Fig. 4. The pipe communicates with what is the top of the biggin when the coffee is being cooked, and its outer end (which need not be closed) can be conveniently armed with a whistle W, which will be blown by the escaping steam when the coffee is at or near a boil. The whistle is detachable, being in this instance screwed upon the outer end of the vent-pipe F. Whenever it is desired to add to the contents of the biggin when it is bottom upward—that is to say, in the position shown in Fig. 3—all that is needed is to unscrew and take off the whistle W and to apply to the outer end of the vent-pipe F the funnel X, into which the water or other material to be added can conveniently be poured.

To use the coffee-pot, the biggin in the position shown in Figs. 2 and 4 is supplied through its open neck, with a suitable charge of coffee and water. The straining-cloth is then applied over the mouth and around the neck of the biggin and is secured in that position. The coffee-pot inverted is put over the neck of the biggin and then the device is set upon a stove or put over a lamp until the coffee is made, the air-pipe D during this operation being closed by the screw-cap $d$. After the coffee is made the parts are inverted, so as to bring the bottom uppermost and neck downward, with the coffee-pot below, as in Fig. 3. In this position the ground coffee will settle into the neck of the biggin and form a bed through which the liquid must pass before it can escape into the pot. So long as the cap $d$ is closed little or no liquid will pass down into the pot, owing to the superior air-pressure from below the straining-cloth; but as soon as the cap is moved so as to admit air into the pipe D the coffee will at once drip through the cloth with a rapidity that can be regulated by adjusting the cap to admit more or less air, as desired.

It is to be remarked that to retain the coffee in the biggin when the latter is in the position shown in Fig. 3 the whistle W should be removed from the pipe F and the open end of that pipe should be closed by a cork or other stopper before the biggin is turned bottom upward.

By the employment of pipes thus arranged I am enabled to dispense with all ground valves and joints without impairing the efficiency of the parts. Should any liquid be in the pipe D when the biggin is inverted, (as in Fig. 3,) so as to bring the outer end of that pipe lowermost, the moment the cap $d$ is opened the inrush of air through the pipe to what is then the top of the biggin will carry the liquid with it back into the pot.

In the modification shown in Figs. 5 to 8 the biggin has but one handle, (marked Y,) which is inserted and held in the socket H' of a casting H, which is welded, soldered, brazed, or otherwise suitably secured to one side of the biggin and is formed with channels D' F', corresponding, respectively, to the pipes D F of Figs. 1 to 4 and occupying the same relation to the biggin as the two pipes last named. The channel D' opens into the socket H' and communicates with a pipe D², which passes axially through the handle Y and has on its outer open end a vent-cap $d$, similar in function and operation to the like lettered cap in Figs. 1 to 4. The channel F'(corresponding to the vent-pipe F, Figs. 1 and 4) does not enter the handle, but is confined to the casting to which the handle is secured. The outer end of this channel, as shown in Fig.

8, is somewhat enlarged and internally tapering, so as to permit a whistle or a stopper to be jammed into it; but the whistle or stopper can be applied to it, if applied at all, in any other suitable way. By thus concentrating both air-channels in a single casting I am enabled to cheapen and simplify the construction and to conveniently use but one handle on the biggin.

Having described my improvements and the best way now known to me of carrying the same into practical effect, I state, in conclusion, that I do not restrict myself narrowly to the structural details hereinbefore described and illustrated, since manifestly the same can be varied considerably without departure from the spirit of the invention; but

What I claim herein as new, and desire to secure by Letters Patent, is as follows:

1. In a drip-coffee pot a reversible biggin having a broad bottom and body in which the coffee is cooked, and a narrow comparatively long neck in which, when the biggin is turned bottom side up, the ground coffee is assembled and concentrated, a strainer covering the mouth and extending thence around and secured upon the sides of the neck, and a pot proper into which the coffee is strained from the biggin, having a neck or mouth in which the neck of the biggin is received and loosely fits, whereby the portion of the strainer which extends upon the sides, as well as that which covers the mouth, of the neck, is utilized for straining, substantially as and for the purposes hereinbefore set forth.

2. In a drip-coffee pot of the kind described, a reversible biggin in combination with an air-pipe which at one end opens into the biggin at or near the neck or open end thereof and thence extends to or nearly to the bottom of the biggin where it opens into the external air, substantially as and for the purposes hereinbefore set forth.

3. In a drip-coffee pot of the kind described, and in combination, a reversible biggin, an air-pipe opening into the biggin at or near its bottom, and thence extending toward the mouth end of the biggin, and a vent-pipe opening into the body of the biggin at or near its top and extending thence to or nearly to the opposite end or bottom of the biggin, the outer open end of each pipe being external to the biggin, substantially as and for the purposes hereinbefore set forth.

4. In a drip-coffee pot of the kind described, a reversible biggin and a casting secured to said biggin containing two separate air-channels which at their inner ends communicate with opposite ends of the interior of the biggin, and thence extends to or nearly to the end of the biggin, opposite that which they respectively enter and having their outer ends external to the biggin, substantially as hereinbefore described and illustrated.

In testimony whereof I affix my signature in presence of two witnesses.

THOMAS B. FERGUSON.

Witnesses:
W. LEE HELMS,
GEO. W. REA.